United States Patent Office 3,549,502
Patented Dec. 22, 1970

3,549,502
PROCESS FOR THE PRODUCTION
OF NEUTRAMYCIN
Martin Paul Kunstmann, Pearl River, N.Y., Lester Allen Mitscher, Columbus, Ohio, and John Norman Porter, Ramsey, N.J., assignors to American Cyanamid Company, Stamford, Conn., a corporation of Maine
No Drawing. Filed Aug. 19, 1968, Ser. No. 753,715
Int. Cl. C12d 9/14
U.S. Cl. 195—80
3 Claims

ABSTRACT OF THE DISCLOSURE

This disclosure describes a process for the production of neutramycin which comprises cultivating a neutramycin producing strain of a species of the genus Streptomyces selected from the group consisting of *Streptomyces luteoverticillatus* and mutants thereof in an aqueous nutrient medium under submerged aerobic conditions.

BRIEF SUMMARY OF THE INVENTION

The present invention relates to the antibiotic neutramycin and, more particularly, is concerned with an improved process of preparing neutramycin by fermentative biosynthesis. The present invention is based upon the discovery that *Streptomyces luteoverticillatus* and mutant strains thereof possess the property of producing neutramycin in an aqueous nutrient medium under submerged aerobic conditions, in much greater yield than heretofore obtainable by fermentative biosynthesis with *Streptomyces rimosus* NRRL No. 3016. The invention also relates to a novel method of recovering the antibiotic from the fermentation broth by extracting the fermentation beer with a water immiscible organic solvent, concentrating the extract to a solid residue, and recrystallizing the neutramycin therefrom.

DETAILED DESCRIPTION OF THE INVENTION

The antibiotic neutramycin and its method of preparation from *Streptomyces rimosus* NRRL No. 3016 are described in U.S. Pat. No. 3,377,342 to Lefemine et al. Neutramycin is active against gram-positive microorganisms such as staphylococci, pneumococci and streptococci. Neutramycin shows substantial antibacterial activity in vivo in mice against *Staphylococcus aureus*, strain Smith and against *Staphylococcus aureus*, strain Rose when administered orally or subcutaneously. The antibiotic is thus potentially useful as a therapeutic agent in treating bacterial infections in animals caused by such microorganisms. The physical and biological characteristics of neutramycin are further detailed in an article entitled "Neutramycin, A New Neutral Macrolide Antibiotic" by Lefemine et al., pp. 41–44 of Antimicrobial Agents and Chemotherapy (1963), published by the American Society for Microbiology, Ann Arbor, Mich. The chemical nature of neutramycin is described by Kunstmann and Mitscher, Experientia, XXI, 372 (1965).

In accordance with the novel process of the present invention, neutramycin is formed in good yield by the cultivation of *Streptomyces luteoverticillatus* and mutants thereof in an aqueous nutrient medium under submerged aerobic conditions. The microorganism *Streptomyces luteoverticillatus* has been described, based on diagnostic characteristics observed, by Ryuji Shinobu in an article entitled "Three New Species of Streptomyces Forming Whirls" published in the Memoirs of the Osaka University of the Liberal Arts and Education, B. Natural Science, No. 5 (1956). A viable culture of *Streptomyces luteoverticillatus* has been deposited with the Institute for Fermentation, Osaka, Japan, and has been added to its permanent collection as No. 3840. The microorganism is listed as Shinobu No. 486 in the third edition (1962) of the cultures on deposit with the Institute for Fermentation, Osaka, Japan.

It is to be understood that for the production of the antibiotic, the present invention is not limited to this particular microorganism or to microorganisms fully answering the growth and microscopic characteristics as described by Ryuji Shinobu which are referred to for illustrative purposes. In fact, it is desired and intended to include the use of mutants produced from *Streptomyces luteoverticillatus* by various means such as X-radiation, ultraviolet radiation, nitrogen mustard, phage exposure, and the like.

The higher yield of neutramycin obtainable by the use of *Streptomyces luteoverticillatus* in accordance with the fermentation process of the present invention constitutes a practical advantage and improvement over the prior art. For example, a typical fermentation with *Streptomyces rimosus* NRRL No. 3016 according to the procedure described in U.S. Pat. No. 3,377,242 to Lefemine et al. yields nearly pure neutramycin in the amount of 6 gamma per milliliter of beer. In contrast to this, a typical fermentation with *Streptomyces luteoverticillatus* yields neutramycin of comparable purity in the amount of 45 gamma per milliliter of beer, or more than a seven-fold increase.

The cultivation of the microorganism *Streptomyces luteoverticillatus* may be carried out in a wide variety of aqueous nutrient media. That is, the fermentation medium contains the usual nutrients and mineral substances for fermentative biosynthesis. Suitable nutrients include an assimilable source of carbon such as starch, dextrose, cane sugar, glucose, molasses, glycerol, and the like. An assimilable source of nitrogen may be supplied through the use of proteins, protein hydrolysates, polypeptides, amino acids, urea, corn steep liquor, meat extracts, peptone, distiller's solubles, fish meal, soybean meal, milk solids, yeast and other conventional substances. The common inorganic anions and cations such as sodium, potassium, calcium, chloride, sulfate, phosphate, etc., are supplied in the form of their non-toxic salts. Trace elements such as manganese, cobalt, zinc, copper, iron, boron, molybdenum, etc., are supplied either as impurities of other constituents of the medium, or through the use of tap water, or by specifically adding solutions especially enriched with these trace elements. Aeration in tanks and bottles is provided by forcing sterile air through or onto the surface of the fermenting medium. Further agitation is provided in tanks by a mechanical impeller. An antifoaming agent, such as 1% octadecanol in lard oil, be added as needed.

The other general conditions of the fermentation such as hydrogen ion concentration, temperature, time, rate of aeration, preparation of the inoculum, sterilization, inoculation, and the like, are conventional and are similar to those for the production of various tetracyclines as set forth in U.S. Pat. No. 2,482,055 to Duggar, U.S. Pat. No. 2,734,018 to Minieri et al., and U.S. Pat. No. 2,878,289 to McCormick et al. Preferably, however, the fermentation is carried out at a temperature of from about 20° C. to about 35° C. for a period of time of from about 24 hours to about 240 hours.

Shaker flask inoculum of *S. luteoverticillatus* is prepared by inoculating 100 milliliters of sterile liquid medium in 500 milliliter flasks with scrapings or washings of spores from an agar slant of the culture. The following medium is ordinarily used:

|  | Grams |
|---|---|
| Cerelose | 20 |
| Soy flour | 10 |
| Corn steep liquor | 5 |
| Calcium carbonate | 3 |

Water to 1000 milliliters.

The flask are incubated at a temperature from 25 to 29° C., preferably 28° C., and agitated vigorously on a rotary shaker for 30 to 48 hours. These 100 milliliter inocula are used to inoculate one liter and twelve liter batches of the same medium in 2-liter and 20-liter glass fermentors. The inoculum mash is aerated with sterile air while growth is continued for 30 to 48 hours. These batches of inocula are used to inoculate tank fermentors.

For the production of neutramycin in tank fermentors the following fermentation medium is ordinarily used:

|  | Grams |
|---|---|
| Starch | 52.5 |
| Corn flour | 14.5 |
| Corn steep liquor | 15.0 |
| Calcium carbonate | 9.5 |
| Ammonium sulfate | 6.75 |
| Casein | 3.0 |
| Cottonseed flour | 2.5 |
| Ammonium chloride | 2.0 |
| Manganese sulfate | 0.10 |

Water to 1000 milliliters.

Lard oil is added to the medium in the amount of 0.8% v./v. each tank is inoculated with approximately 3% of the inoculum prepared as described above. Aeration is supplied at the rate of 0.5–1.0 liter of sterile air per liter of broth per minute and the fermenting mixture is agitated by an impeller driven at 400–800 r.p.m. The temperature is maintained at 25–29° C., usually at 28° C. The fermentation is ordinarily continued for 100 to 120 hours at which time the mash is harvested.

After the fermentation is complete, the fermentation mash containing the neutramycin is filtered, preferably at pH 6.0, to remove the mycelium from the broth. Diatomaceous earth or any other conventional filtration aids may be used to assist in the filtration. Normally the mycelial cake is washed with a small amount of water and the wash is pooled with the filtrate. Thereafter, the antibiotic may be recovered from the filtrate. For example, neutramycin can be extracted from the filtrate with a water immiscible organic solvent such as ethyl acetate, chloroform or methylene chloride, preferably at the existing pH (usually 5–8). The extract is then ordinarily concentrated under reduced pressure to about 2% of the original volume. The concentrated extract is successively washed with dilute base (typically 2–5% sodium hydroxide or sodium bicarbonate, depending on the nature of the acidic material present in the extract), water, dilute acid (typically 1 N hydrochloric acid) and finally water. The washed organic layer is dried with some suitable drying agent (typically anhydrous sodium sulfate), filtered and evaporated to dryness. The residue is then crystallized using a suitable solvent pair (typically methylene chloride-diethyl ether, ethyl acetate-hexane, acetone-water or methanol-water) and the neutramycin crystals removed by filtration. This process is considerably simpler than the process described in U.S. Pat. No. 3,377,242 to Lefemine et al. in that considerable time and effort is saved by elimination of the lengthy chromatography described therein. This improvement is assisted by the higher yields of neutramycin produced by *S. luteoverticillatus* and certain mutant strains thereof. The acid and base washing is necessary since it removes impurities such as tetrangulol and tetrangomycin, etc., which interfere with the crystallization. It is to be noted that this process is applicable to the isolation of neutramycin produced by cultures other than the described *S. luteoverticillatus*. For example, this process may also be adapted in substance to the isolation and purification of neutramycin as produced with *S. rimosus* NRRL 3016.

The invention will be described in greater detail in conjunction with the following specific examples.

EXAMPLE 1

Inoculum preparation

A typical medium used to grow primary inoculum is as follows:

|  | Grams |
|---|---|
| Cerelose | 20 |
| Soy flour | 10 |
| Corn steep liquor | 5 |
| Calcium carbonate | 3 |

Water to 1000 milliliters.

Washed or scraped spores from an agar slant of *S. luteoverticillatus* are used to inoculate 100 milliliters of the above medium contained in a 500 milliliter flask. The flask is then placed on a rotary shaker and agitated vigorously for 48 hours at 28° C. The resulting flask inoculum is transferred to a 2-liter glass fermentor containing one liter of the above medium. The glass fermentor is aerated with sterile air while growth is carried out for about 48 hours, after which time the contents are used to seed a 30-liter tank fermentor.

EXAMPLE 2

Fermentation

A fermentation medium is prepared according to the followng formula:

|  | Grams |
|---|---|
| Starch | 52.5 |
| Corn flour | 14.5 |
| Corn steep liquor | 15.0 |
| Calcium carbonate | 9.5 |
| Ammonium sulfate | 6.75 |
| Casein | 3.0 |
| Cottonseed flour | 2.5 |
| Ammonium chloride | 2.0 |
| Manganese sulfate | 0.10 |

Water to 1000 milliliters.

Lard oil is used in the medium in the amount of 0.8% v./v. The fermentation medium is sterilized at 120° C. with steam at 15 pounds pressure for 45–60 minutes. The pH of the medium after sterilization is about 6.3. Thirty liters of sterile medium in a 40-liter tank fermentor is inoculated with one liter of inoculum, prepared as described in Example 1. The fermentation is carried out at 28° C. using Hodag LG-8 ® oil as a defoaming agent. Aeration is supplied at the rate of 0.7 liter of sterile air per liter of mash per minute. The mash is agitated by an impeller driven at about 800 revolutions per minute. At the end of approximately 110 hours of fermentation time the mash is harvested.

EXAMPLE 3

Isolation and purification

To twenty-nine liters of fermented mash obtained as described in Example 2 is added about 2% (weight/volume) of diatomaceous earth. The mixture is then filtered and the filter cake is washed with about two liters of water. The pad is discarded. The pooled filtrate and water wash are extracted with two 14-liter portions of chloroform. The extracts are combined and concentrated under reduced pressure to about 500 ml. The concentrated extract is successively washed with 250 ml. portions of dilute sodium bicarbonate, water, two portions of dilute hydrochloric acid and two portions of water. The washed concentrate is dried with anhydrous sodium sulfate, filtered to remove the salt and evaporated to a residue of 8.05 g.

If the residue is still contaminated with acidic material it may have to be redissolved in methylene chloride and further washed successively with two 50-milliliter portions of 0.5 N sodium hydroxide and 50-milliliter portions of water, 0.5 N hydrochloric acid and finally water. The rewashed extract is then slurried with anhydrous sodium sulfate and norite, filtered and concentrated to a residue.

This residue is dissolved in a minimal volume of methylene chloride and diethyl ether is added to initiate precipitation of neutramycin crystals which are removed by filtration. The weight of crystalline material so obtained totaled 2.16 g. This crystalline material is dissolved in about 25 ml. of methanol and water is added, while the solution is kept boiling, until the solution becomes cloudy. This is cooled and the neutramycin crystals are collected by filtration. The weight of crystalline neutramycin so obtained is 0.42 g., M.P. 214–216° C., infrared spectrum (KBr disk) identical with that of authentic neutramycin. On further concentration and recrystallization of the aqueous methanolic mother liquor an additional 0.88 g. of neutramycin as well as a smaller quantity of impure neutramycin may be obtained. Repeated recrystallization of the purer neutramycin yields a product having a melting point of 222–223° C.

What is claimed is:

1. A process for the production of neutramycin which comprises cultivating a neutramycin producing strain of a species of the genus Streptomyces selected from the group consisting of *Streptomyces luteoverticillatus* and mutants thereof in an aqueous nutrient medium containing assimilable sources of carbon, nitrogen, and inorganic salts under submerged aerobic conditions until substantial antibacterial activity due to neutramycin is imparted to said medium, and recovering the antibiotic so produced.

2. A process for the production of neutramycin which comprises cultivating a neutramycin producing strain of a species of the genus Streptomyces selected from the group consisting of *Streptomyces luteoverticillatus* and mutants thereof in an aqueous nutrient medium containing assimilable sources of carbon, nitrogen, and inorganic salts under submerged aerobic conditions for a period of time of from about 24 to about 240 hours and at a temperature of from about 20° C. to about 35° C., and recovering the antibiotic so produced.

3. A process as in claim 2 in which the antibiotic is recovered from the fermentation broth by filtering the broth, extracting the antibiotic from the beer with a water immiscible organic solvent, concentrating the extract to a solid residue, and recrystallizing the neutramycin therefrom.

References Cited
UNITED STATES PATENTS 3,377,242   4/1968   Lefemine et al. _ _ _ _ _ _ 424—120

JOSEPH M. GOLIAN, Primary Examiner